(12) United States Patent
Angelini et al.

(10) Patent No.: US 10,647,395 B2
(45) Date of Patent: May 12, 2020

(54) METHOD FOR ASSESSING THE SEVERITY OF UNDERWATER DIVE AND USE OF SAID METHOD IN A DIVE COMPUTER

(71) Applicant: Mares S.p.A., Rapallo (GE) (IT)

(72) Inventors: Sergio Angelini, Lavagna (IT); Lorenzo Tonetto, Camogli (IT)

( * ) Notice: Subject to any disclaimer, the term of this patent is extended or adjusted under 35 U.S.C. 154(b) by 186 days.

(21) Appl. No.: 15/553,994

(22) PCT Filed: Apr. 13, 2016

(86) PCT No.: PCT/IB2016/052086
§ 371 (c)(1),
(2) Date: Aug. 26, 2017

(87) PCT Pub. No.: WO2016/166669
PCT Pub. Date: Oct. 20, 2016

(65) Prior Publication Data
US 2018/0065721 A1 Mar. 8, 2018

(30) Foreign Application Priority Data
Apr. 14, 2015 (IT) ................ GE2015A0048

(51) Int. Cl.
*B63C 11/32* (2006.01)
*B63C 11/02* (2006.01)
(Continued)

(52) U.S. Cl.
CPC .............. *B63C 11/32* (2013.01); *B63C 11/02* (2013.01); *G01C 5/06* (2013.01); *G01C 13/008* (2013.01); *G06G 5/00* (2013.01); *B63C 2011/021* (2013.01)

(58) Field of Classification Search
CPC ... B63C 11/32; B63C 2011/021; B63C 11/02; G01C 5/06; G01C 13/008; G06G 5/00
(Continued)

(56) References Cited

U.S. PATENT DOCUMENTS 4,882,678 A * 11/1989 Hollis .................. B63C 11/32
73/865.1
5,016,483 A * 5/1991 Budinger .............. A61M 16/10
73/865.1
(Continued)

FOREIGN PATENT DOCUMENTS

EP 1481890 12/2004
EP 1481890 A1 * 12/2004 ............. B63C 11/02

OTHER PUBLICATIONS

Imbert J. P. et al. The arterial bubble model for decompression tables calculations. Diving and Hyperbaric Medecine. Proceedings of the 30th Annual Scientific Meeting of the European Underwater Baromedical Society, 2004, pp. 182-198 (Year: 2004).*
(Continued)

*Primary Examiner* — Clayton E. LaBalle
*Assistant Examiner* — Kevin C Butler
(74) *Attorney, Agent, or Firm* — Themis Law

(57) ABSTRACT

A method for for assessing severity of an underwater dive includes calculating a dive severity index by: (a) determining the gas breathed by the diver; (b) measuring the dive time; (c) determining the depth profile of the dive; (d) calculating a dive severity index based on a function of steps (a), (b) and (c); and (e) assessing severity based on the dive severity index calculated in step (d), wherein the steps (a), (b), (c), (d) and (e) are carried out in real time, at each instant of the dive time of the diver, and step (d) is performed according to the formula: $DSI = k_1 * f(GAS) * f(D) * f(T)$, where: DSI is the dive severity index, $k_1$ is an arbitrary constant, f(GAS) is a function of the inhaled gas, f(D) is a function of the dive depth, and f(T) is a function of the dive time.

11 Claims, 10 Drawing Sheets

Figure 1A:
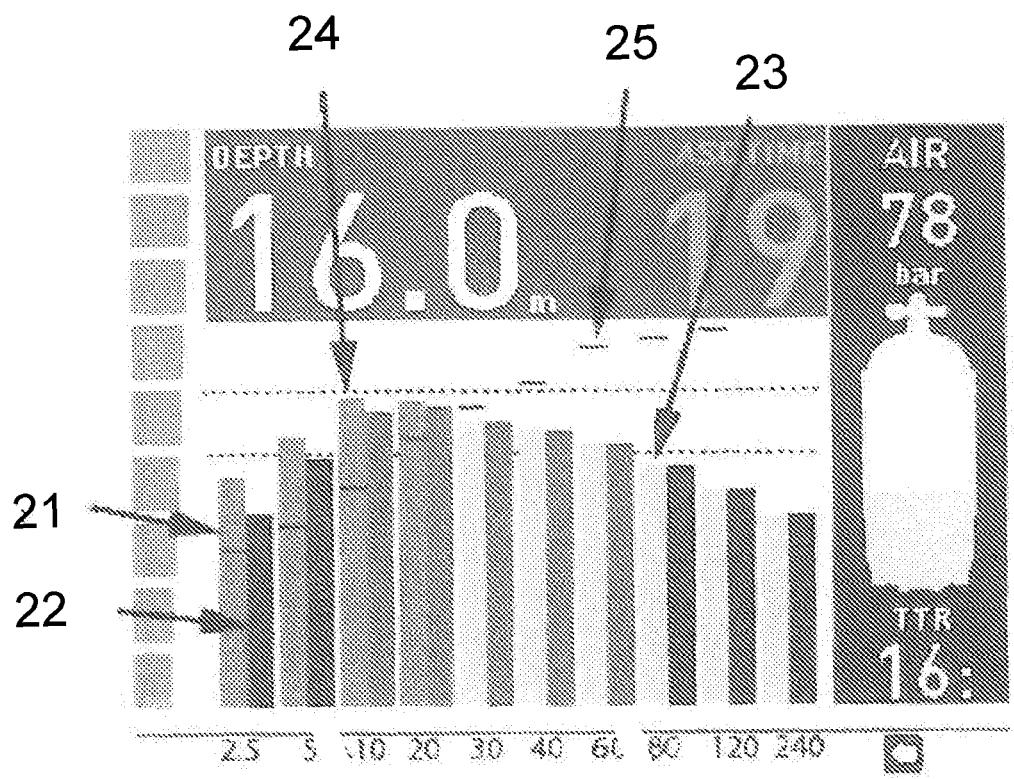

(51) Int. Cl.
    *G01C 13/00* (2006.01)
    *G06G 5/00* (2006.01)
    *G01C 5/06* (2006.01)
(58) Field of Classification Search
    USPC .................................................... 73/865.1
    See application file for complete search history.

(56) References Cited

U.S. PATENT DOCUMENTS

| | | | | |
|---|---|---|---|---|
| 5,363,298 | A * | 11/1994 | Survanshi | B63C 11/32 |
| | | | | 702/139 |
| 5,499,179 | A * | 3/1996 | Sato | B63C 11/32 |
| | | | | 128/201.27 |
| 5,617,848 | A * | 4/1997 | Cochran | A62B 9/006 |
| | | | | 128/201.27 |
| 5,845,235 | A * | 12/1998 | Luukkanen | B63C 11/02 |
| | | | | 702/127 |
| 8,600,701 | B2 * | 12/2013 | Hollis | B63C 11/02 |
| | | | | 702/166 |
| 2007/0213964 | A1 * | 9/2007 | Goldman | B63C 11/02 |
| | | | | 703/11 |
| 2010/0265655 | A1 * | 10/2010 | Metzler | B63C 11/02 |
| | | | | 361/679.55 |
| 2018/0065721 | A1 * | 3/2018 | Angelini | B63C 11/02 |

OTHER PUBLICATIONS

T.G. Shields et al, "Decompression Sickness form Commercial Offshore Air-Diving Operations on the UK Continental Shelf During 1982 to 1988", Society for Underwater Technology, vol. 23, 1989, pp. 259-277 (Year: 1989).*

Wikipedia, 'Dive Computer', Wikipedia, May 20, 2019, 16 pgs (Year: 2019).*

T Breskovic et al., "Venous gas bubble formation and decompression risk after scuba diving in persons with chronic spinal cord injury and able-bodied controls", International Spinal Cord Society, 2008 vol. 46, pp. 743-747 (Year: 2008).*

Imbert J. P., Paris D., and Hugon J.. 2004. The arterial bubble model for decompression tables calculations.Diving and Hyperbaric Medecine. Proceedings of the 30th Annual Scientific Meeting of the European Underwater Baromedical Society, edited by Grandjean B, Corsica, France: EUBS,, p. 182-198 (Year: 2004).*

T.G. Shields et al, "Decompression Sickness form Commercial Offshore Air-Diving Operations on the UK Continental Shelf During 1982 to 1988", Society for Underwater Technology, vol. 23, 1989, pp. 259-277 (Year: 1998).*

U.S. Environmental Protection Agency, Diving Saftey Manual (Revision 1.3), Apr. 15, 2016, pp. 227 (Year: 2016).*

Richard D. Vann et al., "Resolution and Severity in Decompression Illness", Aviation, Space, and Enviromental Medicine, vol. 80, No. 5, Section I, May 2009, pp. 466-470 (Year: 2009).*

Scuba.com, "Dive Computers", Scuba.com, Inc., Irvine CA, 2000-2019, pp. 3 (Year: 2019).*

Martin DJ Sayer et al., "Decompression management by 43 models of dive computer: single square-wave exposures to between 15 and 50 metres' depth", Diving and Hyperbaric Medicine vol. 44 No. 4 Dec. 2014, pp. 193-201 (Year: 2014).*

Proceedings of the American Academy of Underwater Sciences, Repetitive Diving Workshop, Duke University Medical Center Durham, North Carolina, Mar. 18-19, 1991, pp. 330 (Year: 1991).*

* cited by examiner

METHOD FOR ASSESSING THE SEVERITY OF UNDERWATER DIVE AND USE OF SAID METHOD IN A DIVE COMPUTER

The present invention relates to a method for assessing the severity of underwater dive and use of said method in a dive computer.

Various decompression algorithms are currently used in dive computers.

Generally such computers provides to the diver the ascent time and stops to be carried out at specific depths at the end of a dive such to avoid decompression sickness, that is a disease forming bubbles inside blood vessels or tissues and caused by inert gases, such as nitrogen, that have not been sufficiently eliminated.

Dive computers have been used for more than 25 years by divers and they have served for making diving more safe.

Generally dive computers employ mathematical models, so called decompression algorithms, to assess the effects of hyperbaric exposure on the body and the consequences of the return to atmospheric pressure after the ascent at the end of the dive. In particular decompression algorithms try to assess the uptake of an inert gas, nitrogen and/or helium, from the breathing gas mixture, typically nitrox or trimix, in the various body tissues in the initial diving phase and the release of such inert gases in the final diving phase.

The main factors or paramters that determine the uptake of inert gases by tissues are the type of inhaled gas, the depth and the type of dive.

Depending on the dive profile (i.e. the graph showing the trend of the dive depth as a function of time) for the diver it will not be possible to make an ascent directly to the surface without running high risks of decompression sickness due to inert gases being relased by tissues.

In some cases, dive computers determine one or more decompression stops at a depth starting from 3 meters, during which the diver can release inert gases at pressures higher than ambient pressure, till relasing a sufficient amount of gas such to go to the surface while limiting the risk of decompression sicknesses.

Even if the physiology of the human body in a dive is a very controversial and partially unexplored issue, decompression models based on empiric observations are particularly useful to increase the diver's safety, above all because these have been improved over the years and have a demonstrable efficacy.

The widely used approach is the model that provides to divide the human body into a specific number of compartments, each one defined by a specific rate of nitrogen or helium uptake (generally called as half time) and by a threshold value representing the maximum amount of pressure, called also as tension, exceeding the ambient pressure that can be tolerated by a tissue. The term used for describing the pressure excess in a tissue with respect to ambient pressure is "supersaturation". It is known that tissues with short half times tolerate higher values of supersaturation than tissues having long half times.

The objective of the algorithm then is to calculate at each instant the tension state of each tissue as a function of the pressure of the inhaled inert gas and the half time of the tissue and to verify that the maximum tolerated supersaturation has not been exceeded.

This type of model has different forms and different names, but equations employed are often the same.

A different approach is given by the bubble model, where besides determining the inert gas uptake and relase, calculations are used as regards the growth and decay of "silent" bubbles intended to represent the risk of decompression, where the objective of the algorithm is to control and limit the growth of silent bubbles.

Decompression algorithms known in prior art do not differentiate the type of dive and they use the same equations and mathematical models regardless of the type of the diver dive, resulting in that a 20 minute dive at 20 meter depth uses the same equations and safety criteria for a 100 minute dive at 60 meters.

However experience teaches that the first dive can be considered as safe, while the second dive has to be considered as a highly risk one and both have different effects on the human body, therefore the same mathematical model can hardly efficaciously interpret both the dives. Such algorithms use equations that produce a linear evolution of ascent time as the depth elapsed time increases, while a scientific search made in England in the eighties described in the document: "Decompression Sickness form Commercial Offshore Air-Diving Operations on the UK Continental Shelf during 1982 to 1986", T. G. Shields, P. M. Duff, W. B Lee, S. E. Winlock, Hyperbaric Medicine Unit OT 0-89-029", shows that, by using this type of "linear" algorithms, starting from a given exposure onwards there is a deep increase in the possibility of decompression sickness that can result in believing that a non-linear evolution of the ascent time could be justified.

Such deviation from linearity does not occur immediately but only for specific "exposures" and therefore there is the need of assessing one "exposure", i.e. the need of assigning a severity index to a dive.

Currently all the algorithms available on the market allow only an additional security level to be set, which however is applied from the beginning of the dive and it only makes the algorithm more conservative on the whole.

In a particular case, the algorithm provides to divide the operating range of the computer into three depth ranges, such to assign a conservative level, i.e., a caution level, from the surface to a first depth (for example 30 m), a different conservative level from a depth onwards (for example from 50 m onwards), and to interpolate the two levels in the range defined by such two depths (in this example from 30 to 50 m). However the conservative level is assigned only on the basis of the maximum depth reached by the diver and it does not consider at all the time elapsed at different depths. Also the type of breathing gas is not considered, which makes such approach of dubious use.

The document U.S. Pat. No. 5,363,298 describes a risk decompression meter introducing the concept of pressure exposure index. This index is a combination of all the parameters necessary to calculate the risks the diver suffers from a decompression sickness according to an equation for the calculus of probability. A risk estimator calculates both the pressure exposure index and the decompression sickness risk. The calculation is based on comparing a database of data about dives whose result is known as regards decompression sickness and therefore the pressure exposure index is the consequence of such comparison with data related to other divers. Such risk estimator replaces equations that determine the gas exchange according to tissue ongassing and offgassing simulating models based on the real pressure exposure detected in real-time. Therefore the risk estimated is not based on a pressure/time profile acquired in real-time but on the calibration based on a database. Actually the calculation algorithm is not modified, but a conservative level factor is simply applied such as described above, without directly considering a function of real data related to time, average depth and composition of the gas and are detected in real-time.

Therefore there is an unsatisfied need in prior art dive computers and methods, to provide a system for the objective assessment of the severity of the dive, such to allow the diver to avoid high risk exposures or as an alternative to increase the conservative level of the algorithm as a function of the dive severity.

The present invention achieves the above aims by providing a method for assessing the severity of a dive wherein a dive severity index is provided to be calculated.

The calculation is carried out by the following steps:
a) determining the gas breathed by the diver,
b) measuring the dive time,
c) determining the depth profile of the dive,
d) calculating a dive severity index based on a function of a), b) and c)
e) assessing the severity based on the result of the calculation of the dive severity index d)
the steps a), b), c), d) and e) being carried out in real-time mode, at each instant, during the dive time of the diver,
and the calculation d) being performed using the following formula:

$$DSI = k_1 * f(GAS) * f(D) * f(T)$$

where:
DSI is the dive severity index,
$k_1$ is an arbitrary constant,
f(GAS) is a function of the inhaled gas,
f(D) is a function of the dive depth,
f(T) is a function of the dive time.

As deduced from the formula the severity index is given by a combination of inhaled gas, time and depth therefore it considers the main parameters that have to be analyzed during a dive.

Therefore the severity index allows the various types of dive to be differentiated, allowing the dive profile to be evaluated by the combination of a parameter as a function of the inhaled gas, a parameter as a function of the time and a parameter as a function of depth.

A particularly important aspect of the method of the present invention is the fact of providing a severity index completely independent from the selected decompression algorithm.

It is specified that in case of open circuit dive (diving cylinder with diving regulator) the inhaled gas is determined before the dive and it remains constant during the dive itself.

Therefore it is clear how the step defined above as step a) is not actually performed in real-time mode in open circuit dives.

However the datum related to the determination of the breathed gas is given at the beginning of the dive, but it is used each instant during the calculation of steps b), c) and d) in real-time mode.

Moreover it has to be noted that, on the basis of dive conditions, function f(GAS), f(D) and f(T) can be equal to one, such that the DSI is equal to the arbitrary constant k1.

Moreover functions f(GAS), f(D) and f(T) can be individually equal to one or to a constant value.

For example in the case the function f(GAS) is equal to one, it means that the DSI will be defined by the other functions and it will be independent from the gas level, but it will depend on time and depth.

The same is valid for the remaining functions f(D) and f(T) that can be alternatively and individually equal to constant values such to release DSI values from depth and time values respectively.

As it is clear from what described above the task of the method is to show the diver the severity of the dive he/she is performing and the results can be used by all the algorithms known in prior art.

To this end according to one embodiment, the method of the present invention provides a further step e) changing the parameters of a decompression algorithm on the basis of the value of the dive severity index.

Thus it is possible to change the decompression algorithms known in prior art, by re-scaling them during the dive and in a critical manner based on the dive severity.

Moreover a dynamic method determining the dive severity index is provided such to calculate in real-time the decompression values.

For example it is possible to provide to use the assessing method of the present invention in combination with the known Buhlmann algorithm such to generate an ascent table minimizing the risk of decompression sickness.

In this case the concept is that the Buhlmann algorithm is made more conservative, but in a targeted manner: for example on the base of the severity index, it will be possible to re-scale the Buhlmann algorithm progressively decreasing its values of maximum supersaturation tolerated in case of an increase in the value of the dive severity index.

As an alternative it is also possible to act on half times. For example by increasing the value of a half time during the final phase of the dive, it is possible to slow down the release of inert gas from a given tissue with respect to the basic value, which leads to elongate the decompression time with respect to the basic calculation.

According to a preferred embodiment, the calculation of the dive severity index is performed by the following formula:

$$DSI = 5 * F(GAS)\left(\frac{D_{avg}}{10} + 1\right) * \sqrt{T}$$

where:
$D_{avg}$ indicates the average dive depth, in meters, and continuously updated,
T is the dive duration in minutes up to the considered instant and f(GAS)+function of the inhaled gas and it is equal to 1 in case of air.

By way of example if the inhaled gas is nitrox 32 (32% oxygen and 68% nitrogen), the formula would be adapted as follows:

$$DSI = 5 * \frac{0.68}{0.79}\left(\frac{D_{avg}}{10} + 1\right) * \sqrt{T}$$

namely there is a normalization due to the fraction of nitrogen in the inhlaed gas with respect to the fraction of nitrogen in air (79%).

Preferably the severity assessment step e) identifies the dive as:
non-severe for severity index values less than 80,
a transition from non-severe to severe for severity index values ranging from 80 to 100,
severe for severity index values ranging from 100 to 120,
very severe for severity index values exceeding 120.

Nearly at the end of the dive, when the dive time is still growing while the average depth is strongly dropping as the diver is approaching the surface, there is a moment when the DSI value starts to decrease with respect to the value calculated the previous instant. This does not imply a decrease of the dive severity therefore it is suitable to stop the calculation of DSI when the value starts to drop and to keep the maximum value obtained for identifying the severity to be assigned to the dive.

There are other two cases where it is suitable to stop the further calculation of the DSI:

- when a sufficient amount of compartments pass from inert gas uptake to inert gas release (since this means that the dangerous part, inert gas nitrogen uptake, has finished)
- at a depth close to the surface (for example 12 m) since at such depth the human body is no longer subjected to great stresses due to inert gas uptake.

From what just described above it is clear how it is important the recursive aspect of the calculation of the dive severity index, since the maximum value is the important one, but observing the conditions just described.

The present invention further relates to a decompression method during an underwater dive comprising the following steps:

f) identifying a plurality of biological tissues intended to represent the body of the diver, g) associating each tissue with a half-time and a corresponding threshold value, which half-time identifies the gas take up and/or release rate for the associated tissue and which threshold value defines the maximum amount of pressure above ambient pressure that the associated tissue can tolerate, h) measuring the dive time, i) determining the depth profile of the dive.

The method further provides that as the time and/or depth values of the dive increase the threshold value decreases and/or the half time of at least one tissue increases.

As said above the threshold value and the half time are the two parameters on which it is possible to act in order to make the decompression method of the present invention as conservative. It is clear how such two paramters can be modified in an independent manner, individually or in combination, on the basis of the dive conditions.

Moreover it is specified how time and depth values are related to the dive severity, therefore it is clear how the decompression method of the present invention is related to severity concept.

The dive severity can be for example calculated according to one or more of the above steps, related to the method for assessing the severity of a dive according to the present invention.

Based on the decompression methods known in prior art, as the time and/or depth increases the decompression stops become longer and also deeper stops are added.

Since the methods known in the prior art provide to determine the duration, the depth and the number of decompression stops based on dive conditions, it is clear how the decompression method just described considers the dive severity, by changing the threshold value or half time, that corresponds to a change in the decompression obligation of stops calculated with the methods known in prior art.

The change during a dive of the above mentioned parameters of threshold value and half time, particularly the decrease of the threshold value and the increase of the half time value make the decompression algorithm of the present invention non-linear.

In particular as it will be clear from some shown embodiments, as the dive severity increases the threshold value decreases in a not proportionate manner, that is a not proportionate increase of the decompression obligation. The same result is obtained by increasing the half time in the inert gas release phase due to an increase in the dive severity.

According to a preferred embodiment of the decompression method of the present invention, the increase of the dive severity leads to a decrease of the threshold values and/or an increase of half times of all the tissues identified at step f).

Moreover advantageously the steps f), g), h) i) and consequently also the calculation of the decrease of the threshold value and/or of the increase of the half time, can be performed in real-time.

According to a further embodiment it is specified that the pressure at step g), that is pressure exceeding ambient pressure that can be tolerated by a tissue is given by:

$$p_{tol} = \frac{p_{amb}}{b} + a$$

Wherein b is a parameter mainly responsible for altitude effect a is a parameter related to the half time of each tissue.

As it is deduced the supersaturation, indicated by the maximum pressure tolerated by any tissue, it not uniform, since, as said above, the "fast" tissues withstand a higher supersaturation than the "slow" tissues, with ratios ranging for example from 2,5 to 1,67 (and even such values are a function of the real circumstances).

According to such embodiment, the aim of the decompression method of the present invention is therefore to keep the nitrogen partial pressure of each tissue at a level lower than the tolerated pressure, in particular:

$$p_{N_2} \leq p_{tol}$$

It is speficied that the nitrogen partial pressure for each tissue is defined as:

$$p_{N_2}(t) = p_{N_2}(t_o) + [p_{I_{N_2}} - p_{N_2}(t_o)] \cdot [1 - 2^{-\frac{t}{\tau}}]$$

Wherein $p_{N_2}(t)$=nitrogen pressure in the tissue at instant t, $p_{N_2}(t_o)$=nitrogen pressure in the tissue at instant $t_0$ $p_{I_{N_2}}$=nitrogen pressure in inhaled gas τ=tissue half time The assumption is that the exchange of nitrogen between inhaled gas and alveoli is immediate. The first parenthesis is the maximum gradient available for nitrogen transfer, while the second parenthesis is the time (slowing) effect due to the gradual increase of nitrogen in the tissue, related to half time concept.

Due to the advantageous characteristics described above, the present invention relates also to a dive severity index for assessing parameters during an underwater dive.

As described above the severity index is expressed by the following formula:

$$DSI = k_1 * f(GAS) * f(D) * f(T)$$

Wherein

DSI is the dive severity index, $k_1$ is an arbitrary constant, f(GAS) is a function of the inhaled gas, f(D) is a function of the dive depth, f(T) is a function of the dive time.

The severity index of the present invention can have one or more of the characteristics described above and related to the assessement method of the present invention.

Particularly, according to a variant embodiment, the severity index can be expressed by the following formula:

$$DSI = 5*FN2/0.79\left(\frac{D_{avg}}{10} + 1\right)*\sqrt{T}$$

where:
$D_{avg}$ is the average dive depth, in meters, updated at each instant and T is the dive time in minutes.

Finally the present invention relates also to a dive computer comprising at least one display unit, at least one processing unit comprising processing means for executing a logic program, as well as a unit detecting specific physical dive-related parameters.

In particular the logic program consists of a decompression algorithm which comprises one or more of the features of the method for assessing the severity and of the decompression method of the present invention and described above.

Advantageously the dive computer of the present invention can provide to warn the diver upon reaching specific conditions during the dive, as well as it is possible to provide the diver to manually set such conditions.

To this end the dive computer of the present invention preferably provides control units intended for generating acoustic and/or visual alarm signals upon reaching predetermined dive severity index threshold values.

Moreover it is possible to provide an input/output interface, such to allow the diver to enter controls for changing the parameters of said decompression algorithm.

Figure 1B:
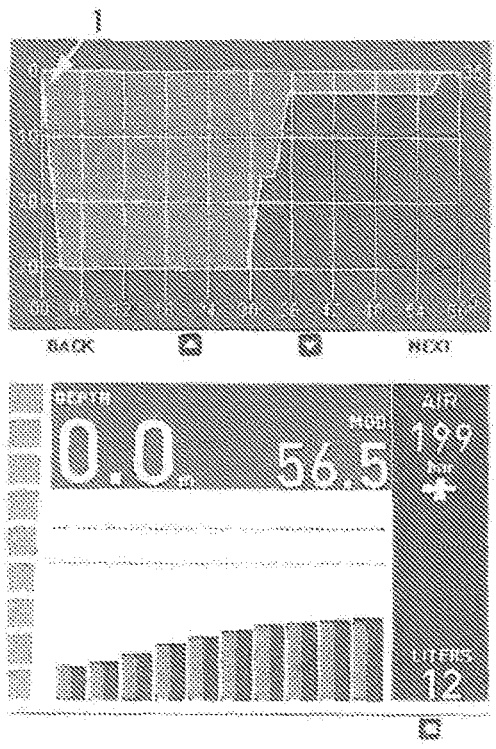
Figure 1C:
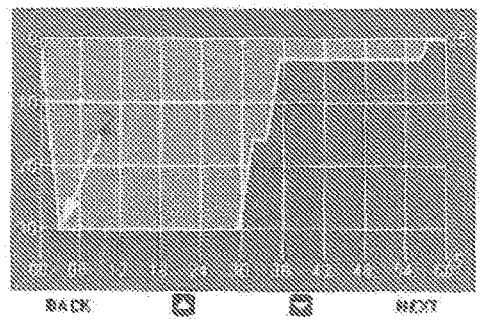
Figure 1C:
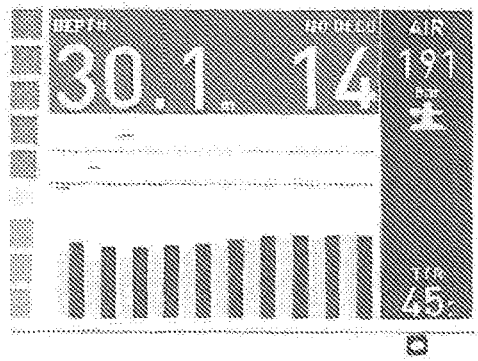
Figure 1D:
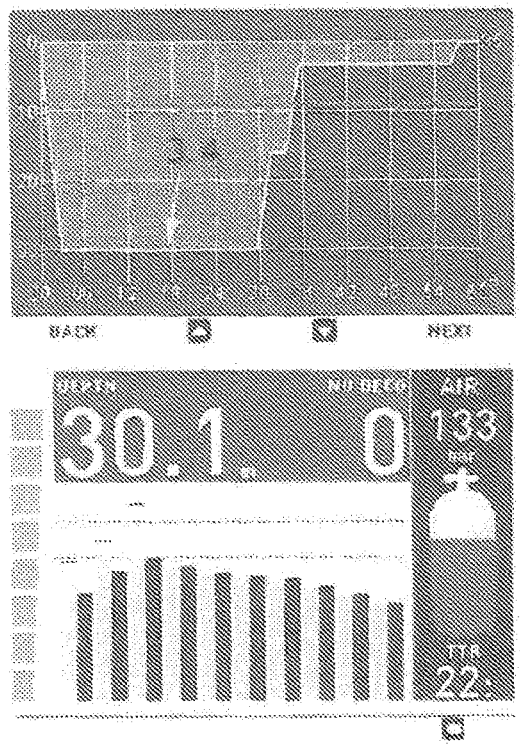
Figure 1E:
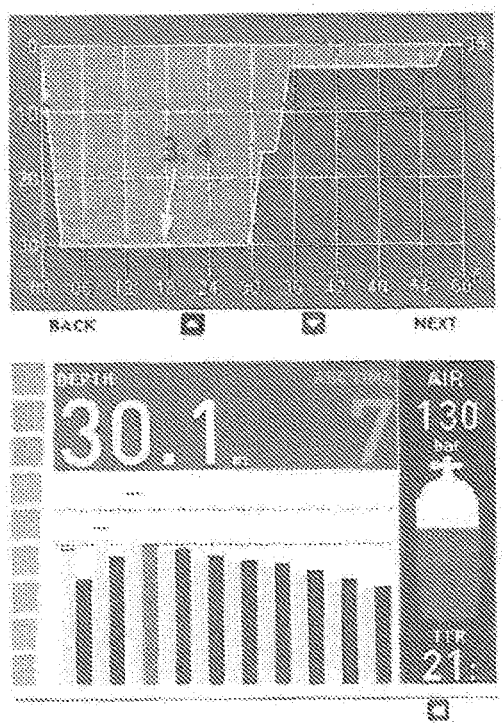
Figure 1F:
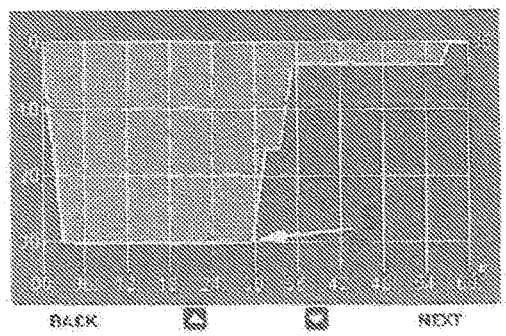
Figure 1F:
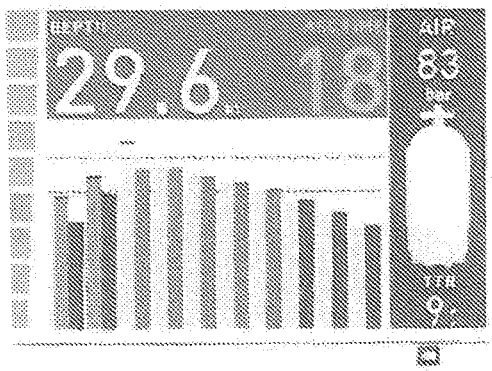
Figure 1G:
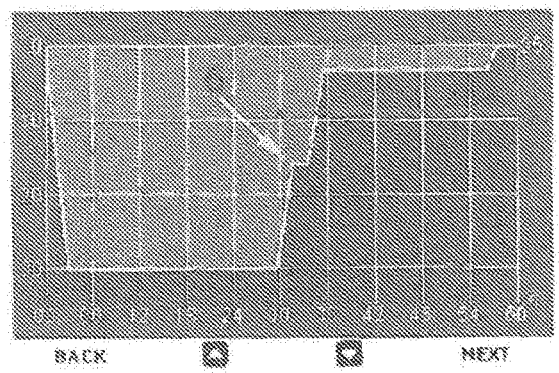
Figure 1G:
Figure 1H:
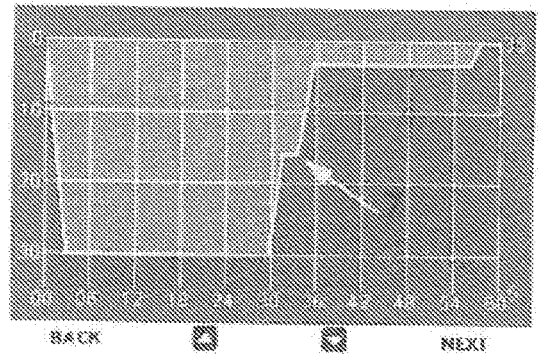
Figure 1H:
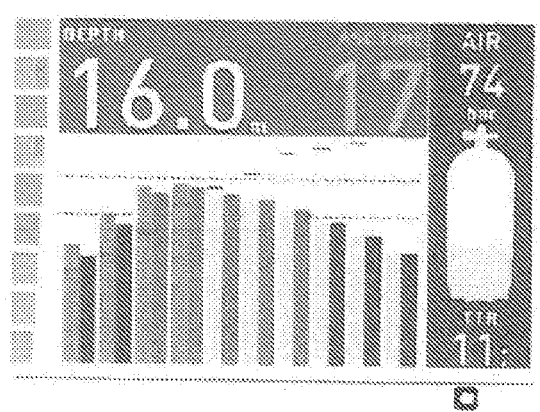
Figure 1I:
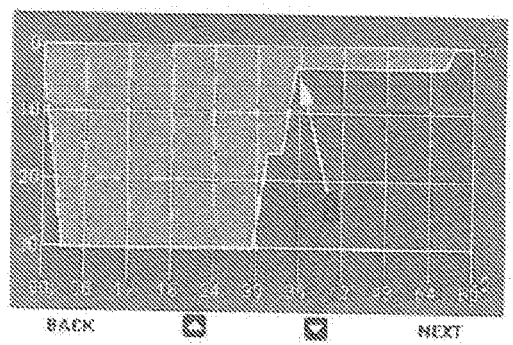
Figure 1I:
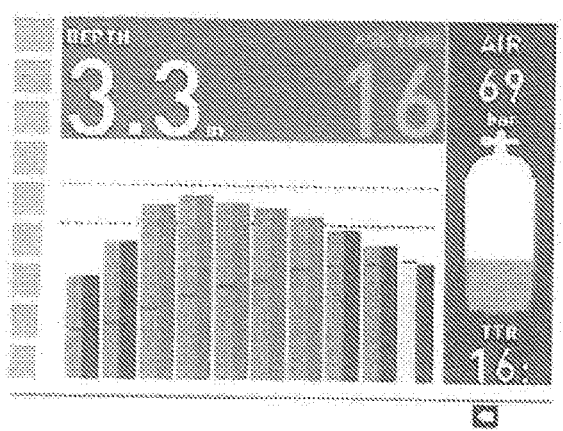
Figure 1L:
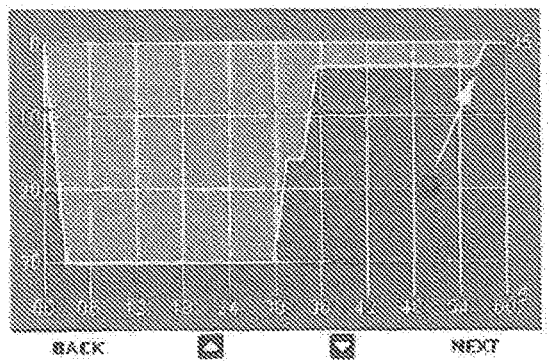
Figure 1L:
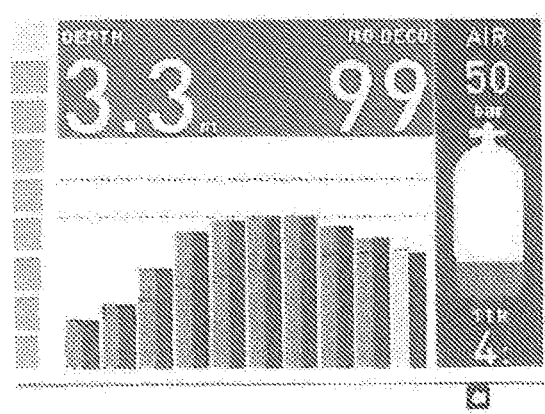
Figure 1M:
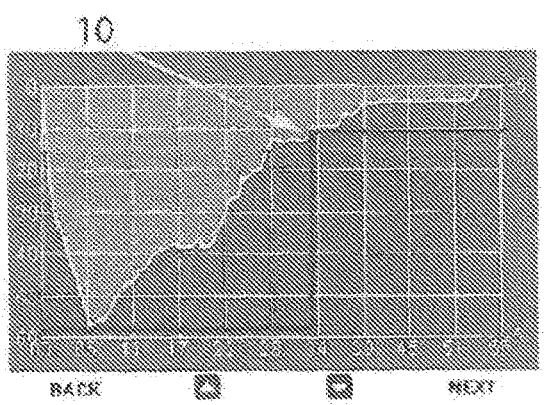
Figure 1M:
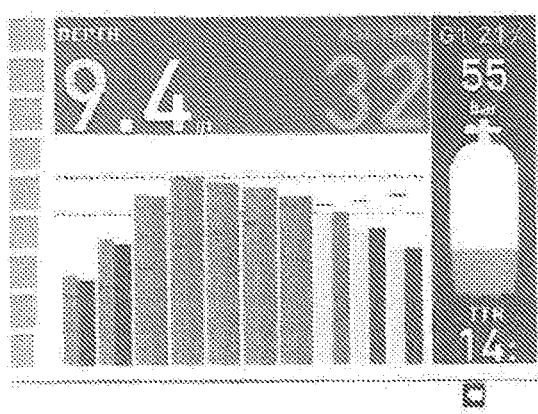
Figure 1N:
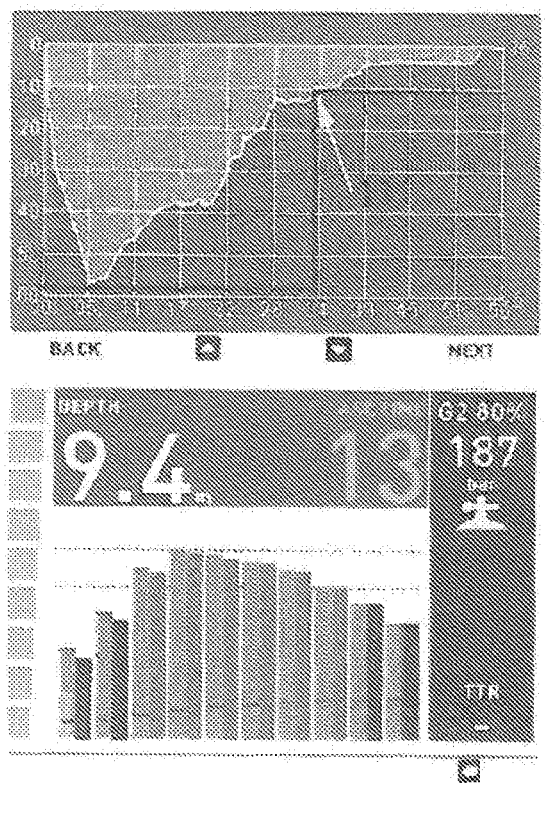
Figure 1O:
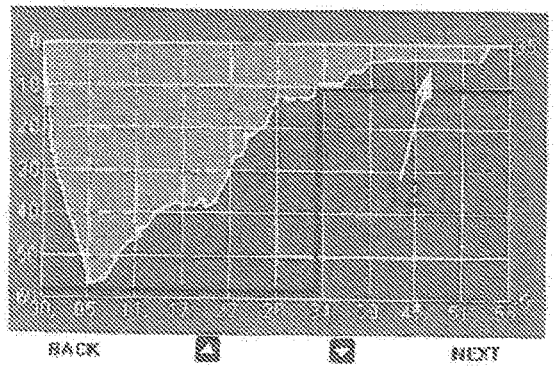
Figure 1O:
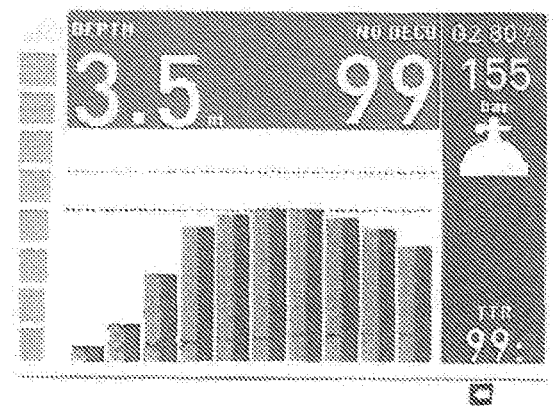
Figure 1P:
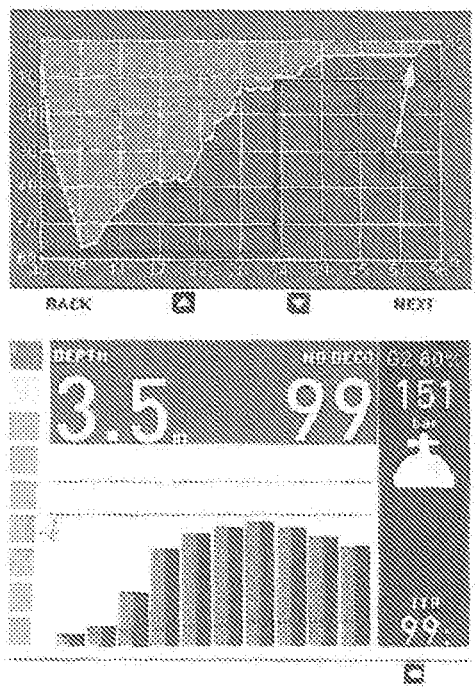
Figure 2:
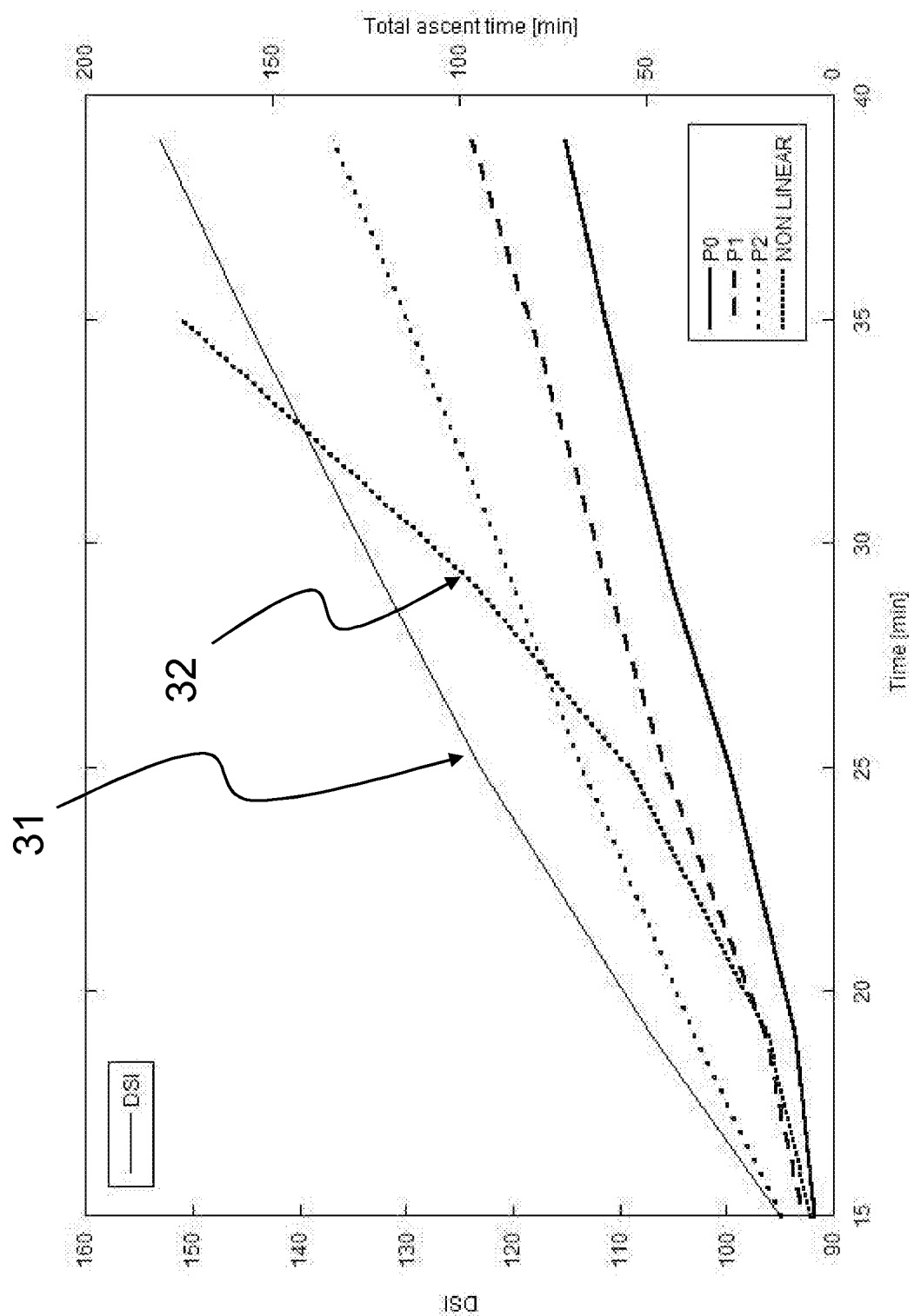
Figure 3A:
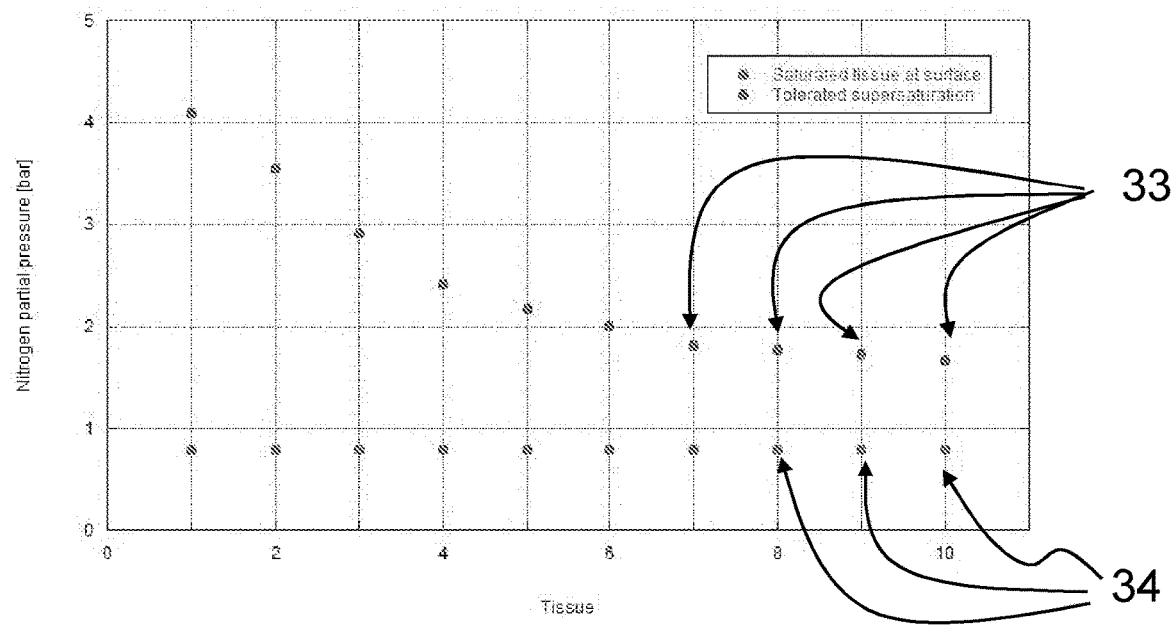
Figure 3B:
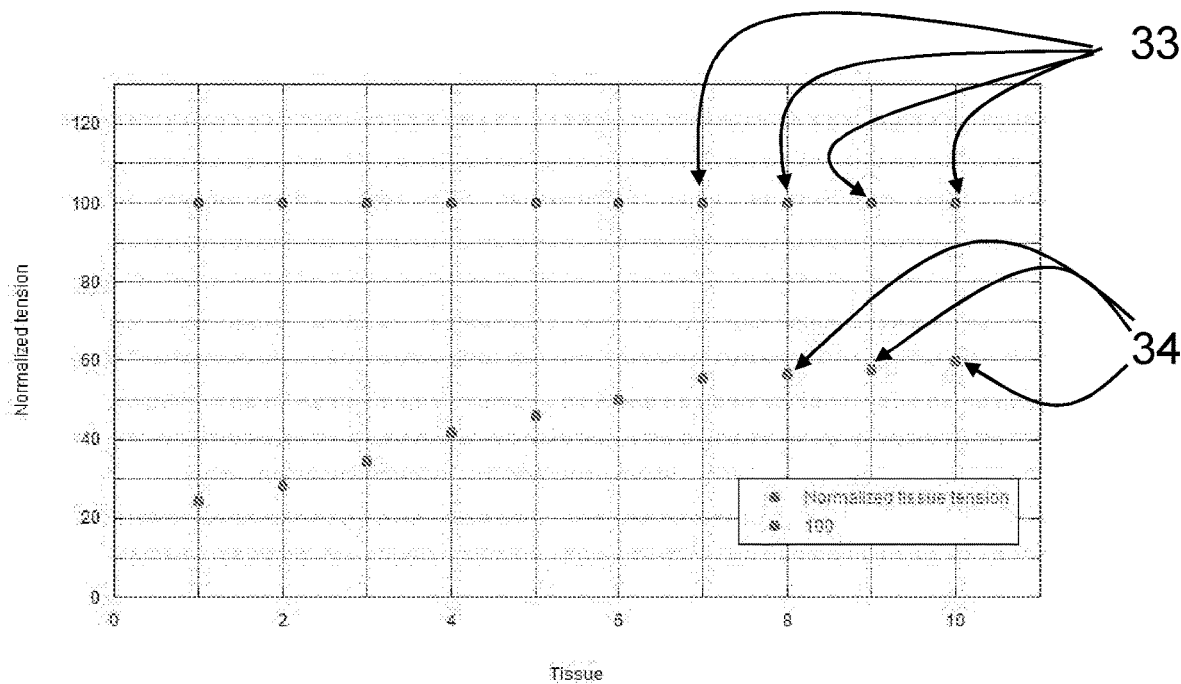

These and other characteristics and advantages of the present invention will be more clear from the following description of some embodiments shown in the annexed drawings wherein:

FIGS. 1a to 1p are some possible dive computer displays of the present invention;
FIG. 2 is a graph obtained by using the decompression method of the present invention;
FIGS. 3a and 3b are two graphs of the steps of the method of the present invention.

It is specified that the figures show a possible implementation of a dive computer providing a dive algorithm comprising a method assessing the severity of an underwater dive according to one or more of the characteristics described above. For simplicity reasons, the example and the figures below consider a binary mixture of oxygen and nitrogen in a constant ratio (open circuit dive with nitrox).

Accordingly the operation of the dive computer is based on any known prior art decompression algorithms in combination with the steps of the assessment method of the present invention.

The parameters that will be described below, recorded by the dive computer, will be modified on the basis of the values of the dive severity index, before being displayed on the screen of the computer.

In particular the parameters that are preferably modified for each biological tissue are half time and maximum tolerated supersaturation value.

Accordingly the decompression algorithm within the dive computer of the present invention is provided in combination with the calculation of a dive severity index, performed by carrying out the following steps:

a) entering the gas inhaled by the diver, particularly the nitrogen fraction in the gas. In the case of a closed circuit dive, the percentage of nitrogen is obtained at each instant from a measurement of the inhaled gas;
b) measuring the dive time,
c) measuring the dive depth and calculating the average value as a function of the dive time,
d) calculating the dive severity index
e) assessing the dive severity based on the calculation of the severity index d).

In particular steps a), b), c), d) and e) are carried out in real-time mode, at each instant during the diver's dive.

Moreover the calculation is performed according to the following formula:

$$DSI = k_1 * f(GAS) * f(D) * f(T)$$

where:
DSI is the dive severity index,
$k_1$ is an arbitrary constant,
f(GAS) is a function of the inhaled gas,
f(D) is a function of the dive depth,
f(T) is a function of the dive time.

Advantageously the calculation of the dive severity index is carried out according to the following formula:

$$DSI = 5*FN2/0.79\left(\frac{D_{avg}}{10} + 1\right)*\sqrt{T}$$

where:
$D_{avg}$ is the average dive depth, in meters, updated at each instant and T is the dive time in minutes.

The dive computer of the present invention comprises at least one display unit, whose screenshots are shown in FIG. 1a to 1p, at least one processing unit comprising processing means for executing a logic program, as well as units detecting specific dive-related physical parameters.

Processing means serve for executing the decompression algorithm in combination with the severity assessing method of the present invention.

The units detecting specific dive-related physical parameters for example can detect the dive time and the dive depth.

As said above the logic program processes such data by following the rules of the decompression algorithm loaded into the dive computer and based on the values of the above severity index.

Particularly the output data from the decompression algorithm will be modified in different manners depending on the dive severity level.

Preferably four severity conditions are provided, in particular:

Non-severe for the severity index values of less than 80,
transition from non-severe to severe for severity index values ranging from 80 to 100,
Severe for severity index values ranging from 100 to 120,
very severe for severity index values exceeding 120.

Likewise to what was mentioned above, the calculation of the dive severity coefficient can be stopped should the diving severity decrease.

Preferably the calculation of the dive severity coefficient can be stopped as soon as one of the following conditions occurs, as an alternative or in combination with each other:
Reaching a depth of 12 m,
Using a specific gas mixture instead of the previously used gas mixture, reaching a predetermined nitrogen release level by one or more of the diver body tissues, the value of the dive severity index calculated in a specific instant is lower than the value calculated at the preceding instant.

A possible implementation of a dive computer having the above characteristics is shown below.

The uptake and release of nitrogen are simulated by a given number of so-called compartments, each one representing a group of body tissues.

For example a compartment represents muscles, another represents bones, etc.

Tissues are identified by the half time, a parameter indicative of the speed at which they take up nitrogen.

With particular reference to the shown embodiment, the decompression algorithm uses ten tissues only for the nitrogen inert gas, with the following half times, in minutes:

2.5, 5, 10, 20, 30, 40, 60, 80, 120, 240.

Tissues with short half times are defined as "fast", those with long half times are defined as "slow".

Each tissue is further identified by a second parameter, a threshold value representing the maximum pressure amount, called also as tension, exceeding the ambient pressure that can be tolerated by a given tissue.

The term used to describe the excess pressure in a tissue with respect to ambient pressure is "supersaturation". It is known that fast tissues tolerate supersaturation values higher than slow tissues.

A dive computer monitors nitrogen ingassing and offgassing for each tissue, based on the depth/time profile and half time of the tissue.

The control criterion for a safe ascent is that no tissue exceeds such excess when diving or upon surfacing.

If such criterion is not met, the ascent is stopped by one or more decompression stops during which nitrogen can be released while the diver is at an ambient pressure at which the control criterion is met.

The several screenshots of FIGS. 1a to 1p describe how nitrogen pressure, called also as tissue tension, develops during a dive and how it affects decompression calculations.

As it is clear from FIG. 1a, the ten tissues are shown on a horizontal axis, with half times increasing from the left to the right.

Each tissue is represented by two vertical bars, a left bar 21 and a right bar 22.

For illustrative purposes, only the bars related to the first tissue on the left have been shown, but what described above and below is valid also for the remaining tissues.

The height of the left bar 21 is the instantaneous load calculated at any given instant in time.

The height of the right bar 22 represents the projection of the value of the left bar 21 after an ascent to the surface at ten meters per minute from the current depth.

This is very important because during the ascent nitrogen continues to be exchanged and this has to be considered (this aspect is obvious if considering that an ascent from 40 meters lasts at least 4 minutes, almost twice the half time of the fastest tissue and almost a full half time of the second fastest tissue).

Depending on the condition of the tissue in a given moment, the left bar 21 can be slightly higher or lower than the right bar 22.

It is higher if the tissue is quite full of nitrogen and during the ascent it will be subjected to offgassing due to the pressure decrease. It is lower if the tissue has not still uptaken much nitrogen and, even if pressure decreases during the ascent, it will ingas more than it will offgas (obviously, each tissue offgases when it is near enough to the surface).

It has to be noted that for slow tissues far most to the right, due to long half times, the difference during an ascent is imperceptible and the two bars representing a tissue 21 and 22 have the same height.

Since different tissues tolerate different supersaturation values, for interpretative purposes the the vertical axis of the graph is normalized such that for each tissue the above mentioned threshold value is at the same height.

FIGS. 3a and 3b show such normalization, in particular FIG. 3a shows the tissue pressure under surfacing conditions before a dive, with points denoted by numeral 34 representing the partial nitrogen pressure in tissues (0.79 atm) and points denoted by numeral 33 representing the maximum tolerated supersaturation.

On the contrary in FIG. 3b the vertical axis is normalized such that the points denoted by numeral 33 are all at level 100 and points denoted by numeral 34 are adapted accordingly.

On such threshold value a horizontal line 23 is drawn through the graph, called as zero line since when the control criterion of the algorithm is met at the surface (0 meters) all the bars are under the line itself.

This serves for a rapid visual control: if one of the right bars crosses this line during the dive, it means that if a diver were to ascend to the surface in this moment, the corresponding tissue would violate the control criterion (it would have overcome the threshold value).

Consequently this implies a decompression obligation, that is it is necessary to spend some time below the surface (at a pressure higher than ambient pressure at surface at which the control criterion is still met) to offgas a part of the nitrogen such to reduce the height of the bar until it drops again below the zero line.

Based on their positioning, it is possible to provide the bars to take different colours.

For example it is possible to provide the right bar 22 to pass from a blue colour to a red colour when crossing the line 23.

Similarly it is possible to provide the dive computer to have control units intended to generate acoustic and/or visual alarm signals upon reaching specific threshold values of the dive severity index.

With a particular reference to FIGS. 1a to 1p, a red right bar 22 denotes a mandatory decompression stop.

When enough nitrogen has been released such that the bar 22 drops again below line 23, the colour turns again to blue.

The screenshot of FIG. 1a provides a second horizontal line 24, above line 23, called as three meter line, representing the control criterion applied at a depth of three meters.

Similarly to what disclosed for line 23, any right bar 22 crossing such line 24 implies that if the diver were to ascend in that moment, the control criterion would be violated already at three meters.

That is to say, when a right bar 22 crosses such line 24 a decompression obligation at 6 m occurs (decompression stops are discretized by 3 m increases).

As already said above, threshold values are not the same for each tissue, the faster tissues tolerate a supersaturation higher than slower tissues, and since all the tissues start the first dive with 0.79 atmosphere of partial pressure of nitrogen (tissues in equilibrium with air at atmospheric conditions at sea level), as a consequence of the normalization of the vertical axis of the graph mentioned above it results that at the beginning of the first dive the tissues on the left are at a level lower than tissues on the right.

FIGS. 1a to 1p are about a first dive that is a non-repetitive dive, such that there is no amount of residual nitrogen from a previous dive that can alter the arrangement.

What described below is also valid for repetitive dives, obviously, the only difference is that the beginning point is not with all tissues at 0.79 atmosphere but it is at a higher level considering what remains from the previous dive and the travelled surface range.

Graphically, however, it is obvious why a repetitive dive is more restrictive than a non-repetitive dive: if there is residual nitrogen from a previous dive, all the bars are closer to the line 23 just from the beginning of the dive and therefore there is less time available before one of them crosses the limit.

At each tissue, the graph of FIG. 1a shows also a small horizontal segment 25 superimposing the left bar 21 of each tissue.

The position of such segment 25 along the vertical axis is the nitrogen partial pressure in inhaled gas.

During a dive the segment 25 moves up and down as depth increases/decreases.

In case of a mixture change, for example from air to 80% nitrox, the position of such segment 25 is subjected to a sharp jump.

The position of such segment 25 along the vertical axis plays an important role in understanding the tissue dynamics, since the distance between the latter and the top portion of the bar is the difference in nitrogen partial pressure between the tissue and inhaled gas, that is the force driving the gas exchange, called also as pressure gradient.

If the two elements are far from each other a strong ingassing or offgassing is occurring (within limits of the half time).

If, on the contrary, the two are near to each other, the tissue is almost in equilibrium.

Even in this case it is possible to provide different colours for the left bars 21 based on their positioning with respect to segment 25.

For example when the segment 25 is above the bar and therefore the tissue is ingassing (partial pressure of inhaled gas is higher than that of the tissue) the left bar 21 can take a yellow colour, while when the segment 25 is inside the bar and therefore the tissue is offgassing (partial pressure of inhaled gas is lower than that of the tissue) the bar can take a green colour.

FIGS. 1b to 1p show an example of a square dive to thirty meters for thirty minutes since conceptually this is the simplest profile for describing the various aspects mentioned above.

Each figure is divided in two parts:

The top part shows the dive graph, that is the trend of depth as a function of time, The bottom part on the contrary shows the screenshot of the display unit belonging to the dive computer, showing the situation of all tissues.

As it will be described below the assessments mentioned below can be applied also to non-square dives.

The ingassing condition of all tissues will be analyzed in nine particular moments of the dive.

FIG. 1b shows the situation at the beginning of the dive.

All tissues are well below the line 23 and the segment 25 representing the partial pressure of the inhaled gas is aligned with the top portion of each bar 21 and 22 (equilibrium under atmospheric conditions).

In case of a dive with nitrox, the segment 25 would be inside the bar, to indicate the fact that breathing nitrox on the surface would lead to initial offassing.

FIG. 1c shows the situation at the end of the descent: the bars have increased slightly their height as nitrogen is uptaken during the minute and a half of the descent.

The segments 25 representing the nitrogen pressure in the inhaled gas have moved upwards, to indicate that gas is pushed within tissues at a speed proportional to the distance between each segment and the top portion of the corresponding bar.

At constant depth, the speed at which a tissue ongasses diminishes over time.

This aspect is graphically visible as the segment 25 symbolizing the inhaled nitrogen pressure does not move (since depth is constant), while the bar increases as nitrogen is uptaken, therefore the two elements get nearer to each other.

If a diver remains long enough at a constant depth, the tissue reaches the segment and the gas exchange stops: the tissue is said to be in equilibrium or saturated. Due to the meaning of half time, after 6 half times at constant pressure, a tissue reaches 98.4% of the pressure at which it is subjected, therefore it can be considered as saturated.

FIG. 1f below shows that after 30 minutes at 30 meters, after an ascent of just 0.5 m the 2.5 and 5 minutes tissues are already releasing inert gas that is are practically saturated while the slower tissues are far from pressure equilibrium as a proportion to the length of the corresponding tissue half time.

FIG. 1d shows the situation at minute 18, just before ending the non-decompression limit: the fastest tissue is practically saturated (the segment 25 and the top part of the bar 21 coincide) while very slow tissues have just grown.

However what is pointed out most in this example is the fact that the right bar 22 of the third segment 25 is about to touch the horizontal line 23.

In the immediately next time point, shown in FIG. 1e, it crosses this limit.

In FIG. 1e the third tissue has crossed the line 23. As mentioned above, this means that such tissue, if brought to the surface at 10 m/min would violate the control criterion and therefore this is the beginning of the decompression obligation.

The other interesting aspect it that also the left bar 21 of the second tissue has crossed the limit, however during a normal ascent such tissue would offgas enough not to violate the control criterion.

Now turning to the end of the 30 m section in FIG. 1f: the control criterion has been violated by 5 segments.

The first two tissues, both saturated at 4 atm absolute pressure, will offgas during the ascent in a sufficient manner not to violate the control criterion.

That is to say, for dives up to 30 m the first two tissues are never the limiting factor.

Moreover it has to be noted that a decrease in depth of 0.5 meters is enough for the first two tissues to beging offgassing, which makes sense since they were practically saturated at 30 m and any decrease in pressure moves the segment 25 below the top part of the bar 21.

FIG. 1g shows ascend to the depth of the deep stop, denoted by the arrow with numeral 6: the first four tissues are offgassing with a considerable gradient, note the distance from the top part of the bar 21 to the horizontal segment 25.

The fifth bar 21 continues the ingassing step, but at a very reduced gradient.

Only from the sixth tissue onwards there is still a considerable gradient for ingassing.

This is the 40 minutes tissue, its ingassing condition being hardly affected by a two-minute stay.

The two minutes however allow fast, and sensitive, tissues to release a great amount of gas while the ambient pressure is relatively high (2.6 atm), controlling and limiting the growth of microbubbles, if any.

This can be deduced from FIG. 1h that shows the tissue saturation at the end of the deep stop: the bars 21 of the first four tissues have considerably decrease, while nothing has changed for the bars 21 of the remaining tissues.

As regards the decompression algorithm, for this profile, a deep stop can be considered advantageous during an ascent.

Now turning to the depth of the decompression stop, FIG. 1i, it has to be noted that all tissues except the slowest ones, are offgassing and five of them still violate the control criterion.

FIG. 1l shows the situation at the end of the decompression obligation: the bars 22 of all the tissues now are below the limit line 23. However, there is no margin of safety, the bars barely meet a criterion for a safe ascent.

For such reason it is always a good idea to perform a 3-5 minute safety stop at 3-5 m, even after a decompression dive.

FIGS. 1m and 1n show the situation during a real dive where a mixture change has been performed from air to 80% nitrox.

In particular, it has to be noted the movement of the horizontal segment 25 just before and just after the mixture change. It is obvious why it is so advantageous to use a high oxygen content mixture.

For this reason, moreover, the method assessing the dive severity of the present invention provides to stop the calculation of the severity index in case of a mixture change with a sufficient decrease in the nitrogen partial pressure.

The nitrogen partial pressure of inhaled gas decreases significantly and not only two other tissues are offgassing instead of ingassing, but the pressure gradients for offgassing have considerably increased in the tissues that were already offgassing.

For the same dive FIG. 1o shows the tissue saturation at the end of the mandatory decompression and FIG. 1p shows such saturation 5 minutes later.

All bars 21 and 22 further decrease and the more they are farther from the lower horizontal line 23, the more the risk of decompression disease decrease.

As said above, the calculation of the dive severity index allows the behavior of the decompression algorithm in the dive computer to be modified on the basis of the values of the index.

In practice, by acting on the threshold value of the maximum tolerated supersaturation based on the value of the dive severity index the position along the vertical scale of the zero line and of the following 3 m, 6 m lines etc is changed.

The higher the severity index is the more threshold values decrease and the more the lines decrease and therefore the more conservative the algorithm becomes. Such decrease of the lines during the dive leads to the non-linearity of the algorithm as mentioned above.

The change of the decompression algorithm can take place automatically, that is the severity index value is calculated and the algorithm parameters are automatically re-scaled.

As an alternative or in combination it is possible to provide the diver to manually change the parameters of the decompression algorithm based on the calculated values of the severity index.

To this end according to one embodiment, the dive computer provides an input/output interface, such to allow the diver to enter controls intended to change the parameters of the decompression algorithm.

Such characteristic is particularly advantageous in combination with the provision of the control units generating alarm signals upon reaching specific values of the severity index.

Thus the diver will be warned and he/she will be able to modify the algorithm.

Finally it is pointed out that such control units can also be responsible for generating acoustic or visual alarm signals, if the algorithm is automatically modified: with each change in the algorithm such control units generate a signal to warn the diver about the change occurred.

As mentioned above the dive computer of the present invention provides a logic program, that, according to one embodiment, is composed of an algorithm performing a decompression method.

According to such embodiment the decompression method comprises the following steps:

f) identifying a plurality of biological tissues intended to represent the body of the diver, g) associating each tissue with a half-time and a corresponding threshold value, which half-time identifies uptake/release rate of the gas by the associated tissue and which threshold value defines the maximum amount of pressure exceeding ambient pressure that can be tolerated by the associated tissue, h) measuring the dive time, i) determining the depth profile of the dive.

Moreover the method provides that as the dive time and/or pressure values increase, the threshold value decreases and/or the half-time of at least one tissue increases.

The method steps and the threshold value have been already widely described with reference to FIGS. 1a to 1p and particularly the threshold value is denoted by reference numeral 23.

The graph of FIG. 2 shows such non-linearity relation and it compares the method of the present invention with the known methods of the prior art.

As it can be noted the graph 2 shows the evolution of the dive severity as the dive time increases at a constant depth of 39 m (left vertical axis) and the evolution of the total decompression time (right vertical axis) for the traditional algorithm with standard conservative level (P0), with increased safety level (P1 and P2), and then for the algorithm considering the dive severity according to the method of the present invention. The evolution of the severity index (DSI) identified by line 31, at a constant depth increases with the square root of the time (therefore it is not a straight line), the evolution of the decompression time according to P0, P1 and P2 follows a "a straight line", while the evolution of the decompression time according to the method of the present invention is clearly nonlinear.

As it can be noted such lines, as the dive time increases, tend to exhibit a non-linear increase, unlike the remaining lines obtained by the methods known in the prior art.

It results that the required decompression time, that is line 32, increases in a manner not proportionate to the increase of the dive time as well as to the increase of the severity index, line 31.

The invention claimed is:

1. A method for assessing severity of an underwater dive, comprising:
   providing a dive computer comprising,
      at least one display unit, and
      at least one processing unit comprising a processor adapted to execute a logic program stored in a non-transitory computer readable recording medium, and units adapted to detect predetermined physical dive-related parameters; and
   calculating a dive severity index by performing the following steps:
   (a) determining an amount of gas inhaled by a diver;
   (b) measuring dive time;
   (c) determining a depth profile of the dive;
   (d) calculating a dive severity index based on a function of steps (a), (b) and (c);
   (e) assessing the severity based on a result of step (d),
   wherein the steps (a), (b), (c) and (d) are performed in real-time mode, at each instant of the dive time of the diver, and
   wherein step (d) is performed according to the following formula:

$$DSI = k_1 * f(GAS) * f(D) * f(T)$$

where:
   DSI is the dive severity index,
   $k_1$ is an arbitrary constant,
   f(GAS) is a function of the inhaled gas,
   f(D) is a function of dive depth, and
   f(T) is a function of the dive time.

2. The method according to claim 1, wherein step (d) is performed according to the following formula:

$$DSI = 5 * \frac{FN2}{0.79}\left(\frac{D_{avg}}{10} + 1\right) * \sqrt{T}$$

where:
   $D_{avg}$ is average dive depth, in meters, updated at each instant,
   T is the dive time in minutes, and
   FN2 is a nitrogen fraction in the gas inhaled by the diver.

3. The method according to claim 2, wherein severity level is assessed at step (e) as:
   non-severe for severity index values of less than 80,
   a transition from non-severe to severe for severity index values ranging from 80 to 100,
   severe for severity index values ranging from 100 to 120, and
   very severe for severity index values exceeding 120.

4. The method according to claim 1, further comprising a step of changing parameters of a decompression algorithm according to a value of the dive severity index.

5. The method according to claim 1, wherein step (d) is stopped in case of a decrease in the dive severity.

6. The method according to claim 1, wherein step (d) is stopped upon occurrence of one or more of the following conditions, in alternative or in combination with one another:
   reaching a depth of 12 m,
   using a specific gas mixture instead of a previously used gas mixture,
   reaching a predetermined level of nitrogen release from one or more tissues of the body of the diver, or
   a dive severity index value as calculated at a given instant is lower than a value calculated at a previous instant.

7. A method of decompression during an underwater dive, comprising the following steps:
   providing a dive computer comprising,
      at least one display unit, and
      at least one processing unit comprising a processor adapted to execute a logic program stored in a non-transitory computer readable recording medium, and units adapted to detect predetermined physical dive-related parameters;
   wherein the logic program performs the following steps:
   identifying a plurality of biological tissues intended to represent the body of a diver;
   associating each tissue with a half-time and/or a corresponding threshold value, the half-time identifying a gas uptake rate by an associated tissue, the threshold value defining a maximum amount of pressure above ambient pressure that the associated tissue is able to tolerate;
   measuring dive time; and
   determining a depth profile of the dive,
   wherein, as the dive time and/or depth values increases, the threshold value decreases and/or the half-time value of at least one tissue increases.

8. The method according to claim 7, wherein an increase of the dive time and/or depth values causes the threshold values to decrease and/or the half-times of all the tissues identified at step (f) to increase.

9. A dive computer comprising:
   at least one display unit; and
   at least one processing unit comprising a processor adapted to execute a logic program stored in a non-transitory computer readable recording medium, and units adapted to detect predetermined physical dive-related parameters,
   wherein said logic program consists in a decompression algorithm comprising one or more of the following steps:
   (a) determining an amount of gas inhaled by a diver;
   (b) measuring dive time;
   (c) determining a depth profile of the dive;
   (d) calculating a dive severity index based on a function of steps (a), (b) and (c);
   (e) assessing the severity based on the step (d) of calculating the dive severity index,
   wherein the steps (a), (b), (c) and (d) are performed in real-time mode, at each instant of the dive time of the diver, and
   wherein step (d) is performed according to the following formula:

$$DSI = k_1 * f(GAS) * f(D) * f(T)$$

where:
   DSI is the dive severity index,
   $k_1$ is an arbitrary constant,
   f(GAS) is a function of the inhaled gas,
   f(D) is a function of dive depth, and
   f(T) is a function of the dive time.

10. The dive computer according to claim 9, further comprising control units adapted to generate acoustic and/or visual alarm signals upon reaching predetermined dive severity index threshold values.

11. The dive computer according to claim 9, further comprising an input/output interface that allows the diver to enter controls for changing parameters of a decompression algorithm.

* * * * *